Patented Oct. 8, 1929

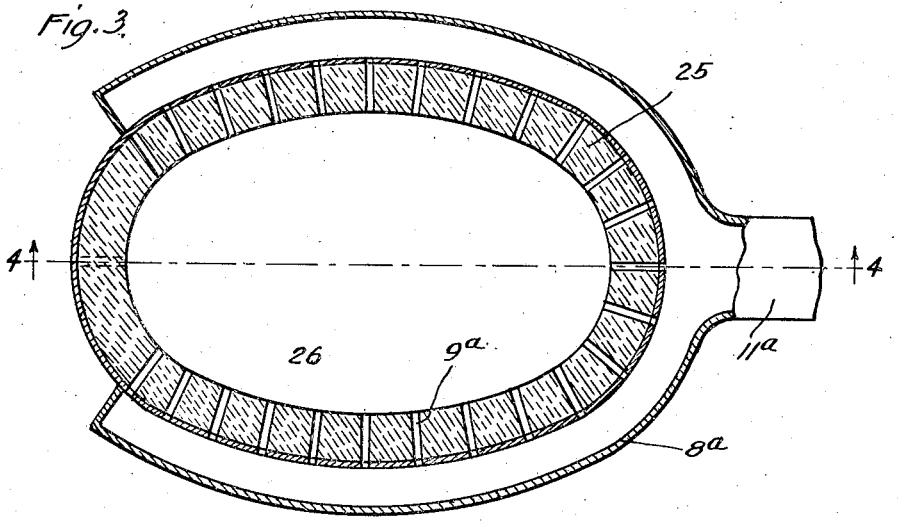
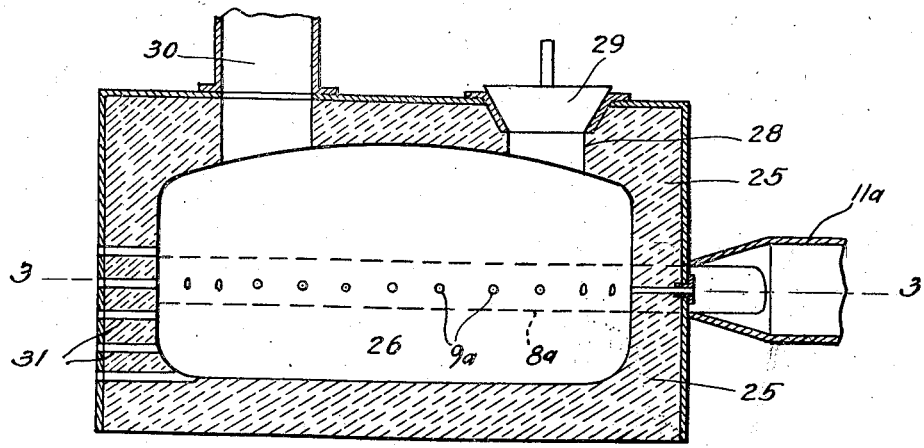

1,730,548

UNITED STATES PATENT OFFICE

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA

METHOD AND APPARATUS FOR REMOVING CERTAIN CONSTITUENTS FROM METAL-BEARING MATERIALS

Application filed April 20, 1927. Serial No. 185,151.

This invention relates to the removal of certain constituents from metal bearing materials, and particularly from smelter slags, by heating such materials in the presence of an added halidizing agent so as to cause volatilization of such constituents in the form of halides.

An important object of the invention is to provide for recovery of metallic values, such as copper, lead, zinc, silver, or gold, from smelter slags or the like, with a minimum consumption of fuel and in a high state of purity. A further object of the invention is to remove one or more of the above named metals from materials containing the same, for the purpose of permitting recovery in a purer state of some other unvolatilized constituent or constituents of the material, such as iron.

A further object of the invention is to provide for production of heat, together with addition of chloridizing agent, beneath the surface of a molten mass of the metal bearing material—and hence in direct contact therewith—so as to obtain more efficient utilization of such heat in effecting fusion of the material, more rapid reaction of the metallic values with the halidizing agent, and more rapid removal of the metallic halides from the mass.

A further object, when the recovery of the volatilized metallic halides is practiced, is to cause the ash constituent of the fuel to be retained in the molten mass of material being treated, and hence prevent the same from being carried off with the metallic halide vapors and contaminating the product.

Particular objects of the invention are to facilitate the reaction between the halidizing agent and the metallic or metal bearing constituents of the material being treated; to facilitate removal of the metallic halide vapors from the molten material and hence maintain a low partial pressure of such vapors in contact with such material, thereby accelerating vaporization of the metallic halides; and to minimize the volume of gases discharged from the volatilizing apparatus, thus obtaining a corresponding reduction in size and cost of the necessary condensing and fume recovering apparatus.

In my United States Patent No. 1,414,491, dated May 2, 1922 there is disclosed a process and apparatus for removing metallic values from slag by contact of a chloridizing agent with the heated slag, with or without further heating of the slag. The process of the present invention constitutes an improvement over that described in said patent, and an essential feature thereof consists in adding both a halidizing agent and a combustible material or fuel to an air blast and delivering this mixture beneath the surface of the mass of material to be treated, such material being maintained substantially in molten condition throughout the major portion of the process. The amount of combustible constituent so supplied is proportioned to give the desired temperature in the molten bath of material, and preferably in the presence of a certain amount of excess air, as I have found that the liberation of halides of the metals above named is greatly facilitated by maintaining an oxidizing or at least non-reducing atmosphere at the point where the halidizing action is carried out.

The halidizing agent may comprise any suitable halide salt, for example finely divided sodium chloride or calcium chloride, and such agent may be introduced into the air blast in any proportion which may be found suitable or desirable for maintaining rapid production and liberation of metallic halides together with a satisfactory efficiency of utilization of such agent.

The heat generated by the combustion of the combustible mixture beneath the surface of the molten material serves to keep the material heated to the desired temperature, to furnish the heat required for the halidizing reaction, and to vaporize the resulting metallic halides. In cases where it is desired to recover the metallic halides thus driven off, the gases escaping from the molten material and consisting principally of combustion products and excess air, together with the metallic halide vapors and other products vaporized from the material being treated, are then cooled to a sufficiently low temperature to cause condensation of the metallic halides in the form of a fume or fine dust, and such fume may then be separated from the gases by any suitable means, for example by means of the Cottrell electrical precipitation process.

In other cases, the method may be used principally or wholly to remove certain constituents which constitute impurities in the desired product. For example many smelter slags and other materials contain considerable quantities of iron which may be recovered therefrom by well-known means, but also contain other metals, such as copper, in sufficient quantity to seriously impair the quality and value of the iron so obtained. In such cases, these undesirable impurities may be removed by means of my present method, and the remaining material may then be treated in any well-known manner, for example as hereinafter described, for the recovery of such iron therefrom.

In some cases the process may be used both for the recovery of metallic values from the material by volatilization, and also for the production of a higher grade product from the unvolatilized material.

Certain forms of apparatus which are particularly advantageous for carrying out the above described process, and which constitute part of the present invention, are shown in the accompanying drawings, and referring thereto:

Fig. 3 is a horizontal section of another form of apparatus, taken on line 3—3 in Fig. 4.

Fig. 4 is a vertical section on line 4—4 in Fig. 3.

Figure 1:
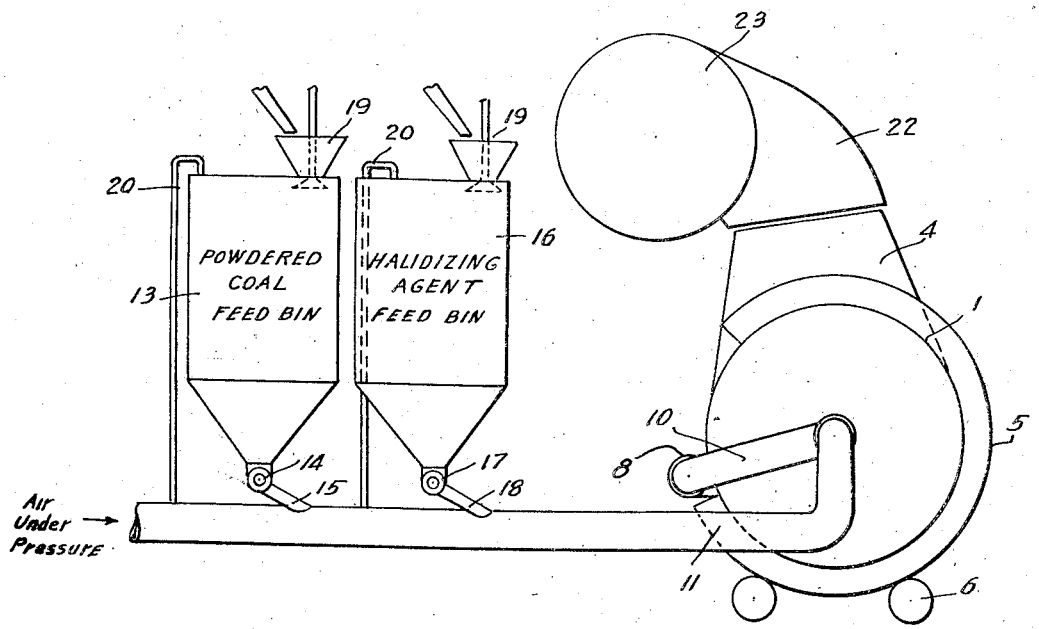
Fig. 1 is a diagrammatic side elevation of one form of such apparatus.
Figure 2:
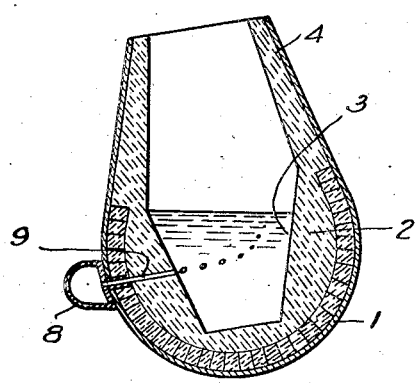
Fig. 2 is a transverse section of the volatilizing apparatus shown in Fig. 1.

The apparatus shown in Figs. 1 and 2 comprises a volatilizing apparatus similar to an ordinary converter and comprising a cylindrical shell 1 lined with refractory material indicated at 2, the interior of which constitutes a heating or volatilizing chamber 3. Said converter is further provided with a tapering mouth portion 4 extending upwardly from the cylindrical portion, through which the material to be treated may be supplied thereto and through which the gases and vapors produced during the operation may be delivered. Said volatilizing device may be mounted in the usual manner of converters, for example by means of track means 5 supported on rollers 6, and may also be provided with any suitable means such as are usually found on converters, for tilting the same about its axis after completion of the volatilizing operation, for discharge of the contents therefrom.

Means are also provided for delivering to the interior of said volatilizing chamber and beneath the surface of the material therein, a mixture of air, fuel, and halidizing agent. Such means may comprise, for example, the usual windbox 8 extending along one side of the converter and provided with a plurality of tuyères 9 distributed lengthwise thereof and establishing communication between said windbox and chamber 3. Said windbox may be connected by means of radially extending pipe 10 to supply pipe 11, in such manner as to permit tilting of the device without disconnecting said pipes.

Pipe 11 may be connected to any suitable source of supply of air under suitable pressure for maintaining a blast of air through the material in the volatilizing device. Means are also provided for supplying to pipe 11 both fuel and halidizing agent, said materials being preferably supplied independently so that if desired at certain stages of the operation, the supply of one or both of these materials may be interrupted. For example a feed bin 13 may be provided for supplying powdered coal or other solid fuel through screw conveyor 14 and pipe 15 into the supply pipe 11, and a second feed bin may be provided for delivering powdered sodium chloride or other halidizing agent through screw conveyor 17 and pipe 18 into the supply pipe 11. Each of said feed bins may be provided with means such as the well known bell and hopper device 19 for admitting material thereto while substantially preventing leakage of air therethrough, and with pressure equalizing pipes 20 communicating with pipe 11 and with the respective feed bins so as to maintain within said feed bins a pressure equal to that in the pipe 11. It will be understood that any form of fuel or combustible material may be used in the process instead of powdered fuel, for example fuel oil or fuel gas may be employer and any suitable means may be provided for introducing such fuel to the air supply pipe.

A vapor hood 22 may be provided over the open end of mouth 4 for receiving the gases and vapors passing out through said mouth, said hood opening into gas passage 23 through which the gases and vapors may be conducted if desired to any suitable apparatus for effecting cooling thereof to cause condensation of the evolved metallic halides, and separation of such halides from the gas stream. For example, as described in my aforesaid patent, said gases may be conducted to a Cottrell electrical precipitator, or to a bag house, settling chamber, spray tower, or other separating apparatus. It will be understood, of course, that flue 23 may if desired be provided with a fan or other means for inducing a slight draft therein so as to insure that substantially all of the vapors passing out of the volatilizing device will be drawn through hood 22 into said flue.

Instead of employing a movably mounted converter or volatilizing device, a stationary form of apparatus may be employed, as shown in Figs. 3 and 4. Said apparatus comprises a housing 25 of suitable refractory material surrounding a heating chamber 26, and may be provided as before with windbox 8$^a$ communicating through tuyères 9$^a$ with said heating chamber. Supply pipe 11$^a$ may be provided as before for conducting the mixture of air, fuel, and halidizing agent to said windbox. The pipe 11$^a$ may be provided with means similar to those shown in Fig. 1 for supplying powdered fuel and halidizing agent thereto, or with any other suitable means for this purpose. The apparatus shown in Figs. 3 and 4 may further comprise opening means 28 through which the material to be treated may be supplied, said opening means being provided with suitable closure means 29. Outlet flue 30 may also be provided for conducting away the gases and vapors for separation of the fume therefrom, and tap holes 31 may be provided through which the unvolitilized residue may be drawn off either continuously or from time to time.

As an example of one method of carrying out my process I will describe the recovery of copper by volatilization, and of iron by subsequent treatment, from smelter slag containing these substances, using the apparatus shown in Figs. 1 and 2. The converter is first tilted to charging position, and the molten slag, coming for example from a reverberatory or blast furnace, is delivered to the interior thereof so as to fill the same to the desired level for example as shown in Fig. 2. The converter is then moved to the position shown in Fig. 1 and the mixture of air, fuel, and sodium chloride or other halidizing agent may then be admitted beneath the surface of the molten material by means of tuyères 9. If it is found desirable, in order to increase the temperature and fluidity of the slag or for any other reason, the combustible mixture of air and fuel may be first admitted without the halidizing agent, so as to subject the material to a preliminary heating operation prior to the volatilizing operation. Furthermore, in case the slag contains an objectionable amount of sulphides, a blast of air alone may be admitted, prior to said volatilizing operation, for a sufficient period of time to lower the sulphide content as may be found necessary. Such preliminary heating and blowing operations are, however, merely incidental to the process and form no essential part of the invention.

During the main volatilizing stage of the operation the three essential constituents, air, fuel, and halidizing agent are introduced together, the air being present in sufficient amount to provide an oxidizing or non-reducing atmosphere, which is necessary for satisfactory volatilization of copper in the form of a halide (or for satisfactory volatilization of the halides of any of the other metals named above). In some cases certain constituents of the slag will be oxidized during this operation and the air supply must therefore be so calculated as to allow for the oxygen thus consumed.

Under the conditions above described the combustion occurs in direct contact with the slag and a maximum efficiency of heat transfer to the slag is therefore obtained. This is to be distinguished from the relatively inefficient heat transfer obtained by combustion in a chamber above a bath of slag as for example in a furnace of the reverberatory type. Furthermore, the incombustible or ash constituent of the fuel is to a large extent mechanically retained in the slag and thus prevented from escaping with the exit gases and contaminating the collected fume. Also the passage of the gaseous products of combustion and other gases up through the molten material serves to thoroughly agitate the same and constantly bring fresh portions of the charge into contact with the hot gases and also with the chloridizing agent. The sodium chloride or other halidizing agent is also supplied into intimate contact with the molten slag, and at the temperature maintained by the above described combustion and in the presence of an oxidizing or non-reducing atmosphere, such halidizing agent reacts rapidly with the copper or copper-bearing materials present in the slag to form copper halides, which are rapidly volatilized and pass off with the combustion gases through the mouth of the converter and hence through hood 22 and flue 23 to the fume collecting means above mentioned. In case sodium chloride is used as the halidizing agent the evolved halide vapor will consist of cuprous chloride (or the chloride or chlorides of whatever metal or metals of those above named are present in the slag). Such vapors condense upon cooling to form a solid fume which may be collected in substantially pure form, due in part to the retention of the ash constituent of the fume in the slag.

After the removal of the desired proportion of the copper as above described the slag may be treated in any well-known manner for recovery of iron therefrom. For example the combustion may be continued with a diminished proportion of air so as to provide a reducing atmosphere within the converter and a suitable material such as lime may be added for the purpose of reacting with iron bearing constituents of the slag to form calcium silicate and set free metallic iron. The iron is produced in a molten condition and may be removed from the converter in this condition by simply tilting the same in the usual manner or, in the case of the apparatus shown in Figs. 3 and 4, by opening the tap holes 31.

The above described process may be applied to materials other than slags, for example to low grade ores of various kinds, containing one or more metals capable of volatilization under the above conditions. It is not necessary that the material to be treated should be charged into the converter in molten condition, as such material may in some cases be introduced in solid form, as for example in the form of lumps or fragments which may then be melted in the converter by combustion in contact therewith of fuel and air supplied through tuyères 9. In case the operation is carried out in this manner, the introduction of halidizing agent along with the fuel and air should preferably not commence until the material is reduced to a molten or fluid condition and heated to substantially the necessary temperature for volatilization of the halide or halides to be formed in the process.

Another modification of the process, in cases where a plurality of different metals of those above named are present in the material, consists in successively increasing the temperature during the volatilizing operation so as to successively evolve halide vapors of successively higher boiling points. The vapors driven off during such successive heating stages may be condensed and collected separately from one another, thus obtaining a separation of such metals by fractional distillation.

In any event the essential features of this process consist in introducing a mixture of air, fuel, and halidizing agent beneath the surface of a molten mass of material to be treated, and in maintaining an oxidizing or non-reducing atmosphere during such operation.

I claim:

1. The method of recovering metallic values from metal bearing materials, which comprises introducing a mixture of air, fuel, and a halidizing agent beneath the surface of a molten body of such material, so as to cause combustion of such fuel in direct contact with such material and production and volatilization of a halide of the metal to be recovered, removing such metal halide from the body of material in vapor form, and then condensing and collecting such metal halide.

2. The method as set forth in claim 1, in which the air is supplied in such proportion as to maintain an oxidizing atmosphere during the operation so as to facilitate the production of said metal halide.

3. The method of volatilizing a metal in the form of a halide from slag containing such metal, comprising bringing such slag to molten condition, and then introducing beneath the surface thereof a blast containing air, combustible material, and a halidizing agent, so as to cause combustion in direct contact with the molten slag and production and volatilization of a halide of said metal.

4. The method as set forth in claim 3, said halidizing agent comprising finely divided sodium chloride.

In testimony whereof I have hereunto subscribed my name this 12th day of April, 1927.

HARRY V. WELCH.